US010824521B2

(12) United States Patent
Vidal et al.

(10) Patent No.: US 10,824,521 B2
(45) Date of Patent: Nov. 3, 2020

(54) GENERATING PREDICTIVE DIAGNOSTICS VIA PACKAGE UPDATE MANAGER

(71) Applicant: RED HAT, INC., Raleigh, NC (US)

(72) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/874,714

(22) Filed: Oct. 5, 2015

(65) Prior Publication Data
US 2016/0026547 A1 Jan. 28, 2016

Related U.S. Application Data

(63) Continuation of application No. 12/714,222, filed on Feb. 26, 2010, now Pat. No. 9,152,484.

(51) Int. Cl.
G06F 11/14 (2006.01)
G06F 11/00 (2006.01)
G06F 8/65 (2018.01)

(52) U.S. Cl.
CPC ............ *G06F 11/1479* (2013.01); *G06F 8/65* (2013.01); *G06F 11/008* (2013.01)

(58) Field of Classification Search
CPC ... G06F 8/70; G06F 8/71; G06F 11/07; G06F 11/79; G06F 11/186
USPC ........................................ 717/168
See application file for complete search history.

(56) References Cited

U.S. PATENT DOCUMENTS

| 5,416,903 | A | 5/1995 | Malcolm |
| 5,510,981 | A | 4/1996 | Berger et al. |
| 5,678,039 | A | 10/1997 | Hinks et al. |
| 5,845,077 | A | 12/1998 | Fawcett |
| 5,903,859 | A | 5/1999 | Stone et al. |
| 6,092,036 | A | 7/2000 | Hamann |
| 6,195,678 | B1 | 2/2001 | Komuro |
| 6,205,418 | B1 | 3/2001 | Li et al. |
| 6,308,288 | B1 * | 10/2001 | Chang ................. G06F 11/2273 714/38.1 |
| 6,351,726 | B1 | 2/2002 | Wong |
| 6,438,749 | B1 | 8/2002 | Chamberlain |
| 6,546,404 | B1 * | 4/2003 | Davis ................. G06F 11/1451 |
| 6,553,507 | B1 | 4/2003 | Cohen |
| 6,778,983 | B1 | 8/2004 | Bates et al. |
| 6,789,215 | B1 | 9/2004 | Rupp et al. |
| 6,845,394 | B2 | 1/2005 | Ritche |
| 6,944,846 | B2 | 9/2005 | Ryzhov |
| 6,957,425 | B1 | 10/2005 | Nadon et al. |
| 6,985,939 | B2 | 1/2006 | Fletcher et al. |
| 6,993,759 | B2 | 1/2006 | Aptus et al. |
| 7,055,131 | B2 | 5/2006 | Charisius et al. |

(Continued)

*Primary Examiner* — Getente A Yimer
(74) *Attorney, Agent, or Firm* — Lowenstein Sandler LLP

(57) ABSTRACT

Embodiments relate to generating predictive diagnostics via a package update manager. A processing device can identify a set of package updates available to update a set of installed software packages on a client machine. Using a diagnostic database and an event log, the processing device identifies a potential fault condition related to the set of package updates. The event log can include a state of the client machine. The processing device can generate a repair action in view of the potential fault condition and generate a modified set of package updates in view of the repair action. The processing device can send the modified set of package updates to the client machine.

14 Claims, 4 Drawing Sheets

(56) References Cited

U.S. PATENT DOCUMENTS

| | | |
|---|---|---|
| 7,065,556 B1* | 6/2006 | Hickey ............... G06F 11/3476 709/202 |
| 7,120,684 B2 | 10/2006 | Lawing et al. |
| 7,152,228 B2 | 12/2006 | Goodwin et al. |
| 7,174,533 B2 | 2/2007 | Boucher |
| 7,194,730 B2 | 3/2007 | Pramberger |
| 7,200,390 B1 | 4/2007 | Henager et al. |
| 7,240,336 B1 | 7/2007 | Baker |
| 7,284,151 B2 | 10/2007 | Chandrasekaran |
| 7,284,157 B1 | 10/2007 | McMichael et al. |
| 7,349,960 B1 | 3/2008 | Pothier et al. |
| 7,359,861 B2 | 4/2008 | Lee |
| 7,367,013 B2 | 4/2008 | Kang et al. |
| 7,512,939 B2 | 3/2009 | Brookner |
| 7,552,452 B2 | 6/2009 | McHugh et al. |
| 7,580,960 B2 | 8/2009 | Travieso et al. |
| 7,624,393 B2 | 11/2009 | Egan et al. |
| 7,634,772 B2 | 12/2009 | Parthasarathy et al. |
| 7,657,885 B2 | 2/2010 | Anderson |
| 7,669,198 B2 | 2/2010 | Chitale |
| 7,792,800 B1 | 9/2010 | Carson et al. |
| 7,797,151 B2 | 9/2010 | Apte et al. |
| 7,836,341 B1 | 11/2010 | Krishnan |
| 7,853,943 B2 | 12/2010 | McCaleb et al. |
| 7,979,530 B1 | 7/2011 | Lee |
| 7,987,087 B2 | 7/2011 | Rich |
| 8,141,071 B2 | 3/2012 | McCaleb et al. |
| 8,196,133 B2 | 6/2012 | Kakumani et al. |
| 8,230,415 B1 | 7/2012 | Thomas |
| 8,258,947 B2 | 9/2012 | Becker et al. |
| 8,312,440 B2 | 11/2012 | Iwama et al. |
| 8,325,558 B2 | 12/2012 | Ryu |
| 8,347,287 B2 | 1/2013 | Kakinari et al. |
| 8,466,478 B2 | 6/2013 | Li et al. |
| 8,554,758 B1 | 10/2013 | Larson et al. |
| 8,700,998 B2 | 4/2014 | Togami, Jr. |
| 8,996,376 B2 | 3/2015 | Fleizach et al. |
| 9,009,184 B2 | 4/2015 | Bennett |
| 9,152,484 B2 | 10/2015 | Vidal et al. |
| 2002/0049788 A1 | 4/2002 | Lipkin et al. |
| 2002/0112200 A1 | 8/2002 | Hines |
| 2002/0116702 A1 | 8/2002 | Aptus et al. |
| 2003/0028825 A1 | 2/2003 | Hines |
| 2003/0051235 A1 | 3/2003 | Simpson |
| 2003/0066054 A1 | 4/2003 | Aarts et al. |
| 2003/0088573 A1 | 5/2003 | Stickler |
| 2003/0187681 A1 | 10/2003 | Spain |
| 2003/0188293 A1 | 10/2003 | Boucher |
| 2003/0229890 A1 | 12/2003 | Lau et al. |
| 2004/0103412 A1 | 5/2004 | Rao et al. |
| 2005/0044541 A1 | 2/2005 | Parthasarathy et al. |
| 2005/0080721 A1 | 4/2005 | Keamey et al. |
| 2005/0097526 A1 | 5/2005 | Hauduc et al. |
| 2005/0193386 A1* | 9/2005 | McCaleb ................. G06F 8/65 717/168 |
| 2005/0204353 A1 | 9/2005 | Ji |
| 2005/0210459 A1 | 9/2005 | Henderson et al. |
| 2005/0256766 A1 | 11/2005 | Garcia et al. |
| 2005/0268297 A1 | 12/2005 | Kovachka-Dimitrova et al. |
| 2006/0075001 A1 | 4/2006 | Canning et al. |
| 2006/0080651 A1 | 4/2006 | Gupta et al. |
| 2006/0100973 A1 | 5/2006 | McMaster et al. |
| 2006/0123393 A1 | 6/2006 | Atkins et al. |
| 2006/0156278 A1 | 7/2006 | Reager |
| 2006/0190773 A1 | 8/2006 | Rao et al. |
| 2006/0190820 A1 | 8/2006 | Chang et al. |
| 2006/0230398 A1 | 10/2006 | Yokota |
| 2007/0038991 A1 | 2/2007 | Schuft et al. |
| 2007/0083855 A1 | 4/2007 | Patel et al. |
| 2007/0157192 A1 | 7/2007 | Hoefler et al. |
| 2007/0169075 A1 | 7/2007 | Lill et al. |
| 2007/0225965 A1 | 9/2007 | Fallen-Bailey et al. |
| 2007/0244735 A1* | 10/2007 | Mital ..................... G06Q 10/10 717/127 |
| 2007/0277167 A1 | 11/2007 | Smith et al. |
| 2008/0019281 A1 | 1/2008 | Liger et al. |
| 2008/0028392 A1 | 1/2008 | Chen et al. |
| 2008/0046786 A1* | 2/2008 | Patel ................... G06F 11/0742 714/100 |
| 2008/0052396 A1 | 2/2008 | Tell et al. |
| 2008/0133143 A1 | 6/2008 | Gustafsson et al. |
| 2008/0134165 A1 | 6/2008 | Anderson et al. |
| 2008/0141240 A1 | 6/2008 | Uthe |
| 2008/0177994 A1 | 7/2008 | Mayer |
| 2008/0189096 A1 | 8/2008 | Apte et al. |
| 2008/0201703 A1 | 8/2008 | Lerum et al. |
| 2008/0201705 A1 | 8/2008 | Wookey |
| 2008/0301672 A1* | 12/2008 | Rao ........................ G06F 8/61 717/177 |
| 2009/0013319 A1 | 1/2009 | Williams et al. |
| 2009/0037830 A1 | 2/2009 | Kulkarni et al. |
| 2009/0037897 A1 | 2/2009 | Dull, III et al. |
| 2009/0076839 A1 | 3/2009 | Abraham-Fuchs et al. |
| 2009/0216860 A1 | 8/2009 | Li et al. |
| 2009/0241099 A1 | 9/2009 | Lee et al. |
| 2009/0265690 A1 | 10/2009 | Naslavsky et al. |
| 2009/0276206 A1 | 11/2009 | Fitzpatrick et al. |
| 2009/0300595 A1 | 12/2009 | Moran et al. |
| 2010/0023933 A1 | 1/2010 | Bryant et al. |
| 2010/0058308 A1 | 3/2010 | Demshur et al. |
| 2010/0058314 A1 | 3/2010 | Wang |
| 2010/0083243 A1 | 4/2010 | Mincarelli et al. |
| 2010/0088695 A1 | 4/2010 | Kakinari et al. |
| 2010/0121906 A1 | 5/2010 | Ku et al. |
| 2010/0131939 A1* | 5/2010 | Hieb ........................ G06F 8/73 717/169 |
| 2010/0162231 A1* | 6/2010 | Lanchares ................ G06F 8/60 717/177 |
| 2010/0185670 A1 | 7/2010 | Krishnan et al. |
| 2010/0318743 A1 | 12/2010 | Fitzpatrick et al. |
| 2011/0040745 A1 | 2/2011 | Zaydman et al. |
| 2011/0107326 A1 | 5/2011 | Dehaan |
| 2011/0161829 A1 | 6/2011 | Kristensen |
| 2011/0191703 A1 | 8/2011 | Doser et al. |
| 2011/0214018 A1 | 9/2011 | Vidal et al. |
| 2011/0214021 A1 | 9/2011 | Vidal et al. |
| 2011/0214112 A1 | 9/2011 | Vidal et al. |
| 2011/0214116 A1 | 9/2011 | Vidal et al. |
| 2011/0214118 A1 | 9/2011 | Antill et al. |
| 2011/0265074 A1 | 10/2011 | Vidal et al. |
| 2011/0296248 A1 | 12/2011 | Vidal et al. |
| 2011/0296393 A1 | 12/2011 | Vidal et al. |
| 2011/0296394 A1* | 12/2011 | Vidal ..................... G06F 8/453 717/171 |
| 2011/0296395 A1 | 12/2011 | Vidal et al. |
| 2011/0296397 A1 | 12/2011 | Vidal et al. |
| 2011/0296398 A1 | 12/2011 | Vidal et al. |
| 2012/0054733 A1 | 3/2012 | Vidal et al. |
| 2012/0054875 A1 | 3/2012 | Antill |
| 2012/0079471 A1 | 3/2012 | Vidal et al. |
| 2012/0090025 A1 | 4/2012 | Milner et al. |
| 2012/0137283 A1 | 5/2012 | Antill et al. |
| 2012/0158621 A1 | 6/2012 | Bennett et al. |
| 2012/0197896 A1 | 8/2012 | Li et al. |
| 2012/0227030 A1 | 9/2012 | Radez |
| 2013/0125107 A1* | 5/2013 | Bandakka ............ G06F 11/1417 717/171 |

\* cited by examiner

GENERATING PREDICTIVE DIAGNOSTICS VIA PACKAGE UPDATE MANAGER

CROSS-REFERENCE TO RELATED APPLICATIONS

This application is a continuation of U.S. patent application Ser. No. 12/714,222, filed Feb. 26, 2010, and is hereby incorporated by reference.

FIELD

The present teachings relate to systems and methods for generating predictive diagnostics via a package update manager, and more particularly to platforms and techniques for conducting general diagnostic inspections of client or target machines configured to receive a package update by inspecting the state of processes, storage, services, and/or other resources on the participating machine, comparing the resource state of that machine to conditions reflected in a debugging database or other resources, and generating corresponding notifications about irregular or faulty software or other conditions on the machine prior to package installation

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set Software package update managers exist to help a user initiate and perform software package updates, such—as, for example, the "yum" (Yellowdog update manager) package update manager available from Red Hat Inc., and others. In general, available software package managers are configured to interact with the set of installed packages on a client and with one or more software package repositories, to directly connect to those databases and download available package updates.

The process of initiating software package updates can involve, however, the risk or possibility of software-related faults, instabilities, bugs, or other undesirable errors or conditions. A number of those potential faults or irregular conditions can have a tendency to occur during the window of time in which package updates are made. For instance, a user who repeatedly downloads and installs updates for a variety of unrelated packages may incur the risk of overwriting copies of files with inconsistent or undesired versions of those files. For further instance, a user may choose to initiate a package update process without fully verifying or validating the source of the package update files, and retrieve and install those files without any virus scans, black-list check, or other security measures. Because existing package update managers are not configured to conduct broader or system-wide inspections to scan for conditions that could lead to complications, the package update process can involve unintended conflicts, faults or other problems whose potential could be enhanced during the updating process. It may be desirable to provide systems and methods for generating predictive diagnostics via a package update manager, in which diagnostic logic and user notification can be integrated into the package update process to detect and possibly flag and correct potentially problematic updates and/or other system conditions, before update activity takes place.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating predictive diagnostics via a package update manager. More particularly, embodiments related to platforms and techniques for monitoring the process of procuring and initiating software package updates, and identify potential conflicts, bugs, faults, and/or other undesired conditions that may arise during or surrounding the update process. In aspects, a package manager can track and manage the installation of one or more software packages and/or updates to those packages (which may be referred to together as a "software package update") on a client, host, target, and/or other machine. The package manager can host or interact with a notification tool containing logic, to trace the identifiers of the software package updates, and to communicate with a diagnostic database. The diagnostic database can contain information, links, and other data to flag or identify potential conflicts, bugs, faults, and/or other conditions based on the selected updates, the state of client resources, and/or other variables. The notification tool can inspect or record any potential conflicts, bugs, faults, and/or other conditions and generate a notification to the user of those potential package installation issues. In aspects, a user can then confirm, discontinue, change, or otherwise process their package update activity. These and other embodiments described herein address the various noted shortcomings in known package update technology, and provide a user with enhanced package and system management capability for installing their software package resources with less potential for software conflicts, errors, or other undesirable results of updating activity.

Reference will now be made in detail to exemplary embodiments of the present teachings, which are illustrated in the accompanying drawings. Where possible the same reference numbers will be used throughout the drawings to refer to the same or like parts.

Figure 1:
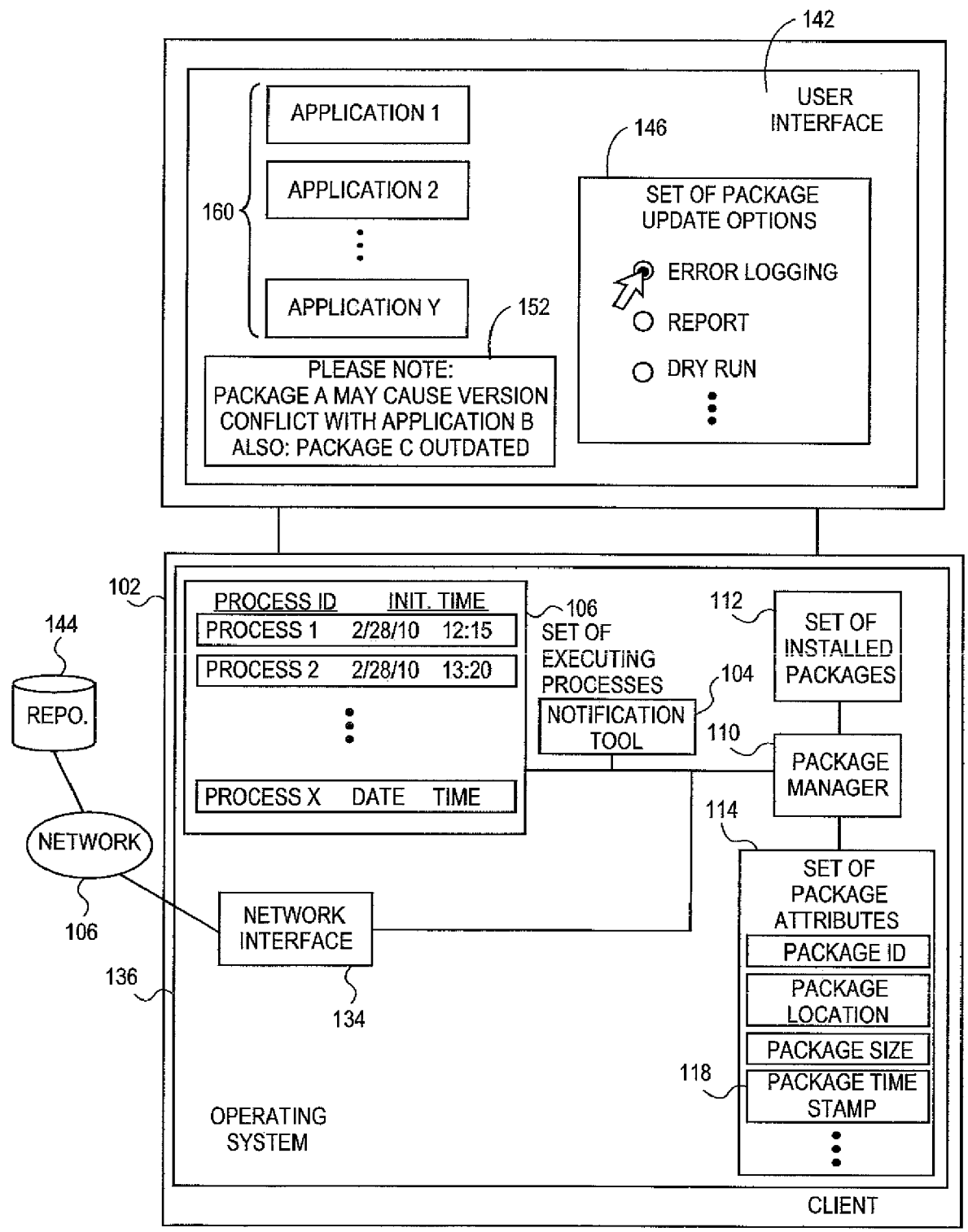
FIG. 1 illustrates an overall network in which systems and methods for generating predictive diagnostics via a package update manager can be implemented, according to various embodiments.

FIG. 1 illustrates an exemplary system 100 in which systems and methods for generating predictive diagnostics via a package update manager can be implemented, according to various embodiments. In embodiments as shown, a client 102 can store, execute, and otherwise host a variety of resources including a package manager 110 configured to communicate with a set of installed packages 112, and other hardware, software, and resources. In embodiments, package manager 110 can be or include a software application, a utility, an application programming interface (API) to an operating system 136 of client 102, a service, and/or other local or remote logic or resources. According to embodiments, in package manager 110 can access and manage set of installed packages 112 to run, edit, update, configure, and otherwise manage one or more software packages hosted or installed in client 102. In aspects, package manager can be or include one or more commercially and/or publicly available package manager applications or resources, such as the "yum" package update manager available from Red Hat Inc. based on or compatible with the Red Hat package manager (rpm) platform, or others.

In aspects, set of installed software packages 112 can be or include packages comprising various types of applications, such as, for example, messaging applications, spreadsheet or modeling applications, social networking applications, word processing applications, and/or other applications or utilities, and can in aspects include an operating system, drivers, and/or components thereof. Set of installed packages 112 can have an associated set of package attributes 114 which records file names, versions, dates, software requirements, an/or other attributes related to the software package updates installed on client 102 and reflected in set of installed software packages 112.

In aspects, package manager 110 can communicate with a network interface 134 configured to connect to one or more network 106, such as the public Internet or other public or private networks. Package manager 110 can thereby connect to one or more package repository 144 hosting software packages including software package updates, and/or other software or resources.

In aspects, package manager 110 can interact with set of installed packages 112 and one or more package repository 144 via set of communication pipes 104 to configure, test, update, and/or otherwise manage set of installed packages 112 operating on client 102. Package manager 110 can, for example, provide a user with a set of package update options 146 displayed via user interface 142, such as a graphical user interface or others, to select various test, configuration, and/or other management activities on set of installed packages 112. Set of package update options 146 can include options such as one or more selections to perform to select packages for installation and/or update, installation options, and/or other options or parameters for the downloading of package updates from one or more package repositories to set of installed packages 112. In aspects, package manager 110 can also communicate with a notification tool 104 hosted on client 102, to monitor package installation activity, and generate predictive and/or post-installation reports and notifications regarding the compatibility, fault status, or other conditions of package update activities conducted on client 102. By examining prospective and/or installed package updates and associated resources during, or before or after the download activity at a time surrounding the update event(s), a user can be apprised of potential faults or other conditions that might be caused by potential or actual software packages activity. Notification tool 104 can generate and deliver those notification(s) at a time when the user may have the greatest chance of intervening to review the package download, client settings and resource states and other resources, to debug and possibly correct the notified conditions. In aspects, the notification tool 104 can contain or access diagnostic logic to examine data generated or hosted by various resources, including set of installed packages 112, operating system 136, one or more repository 144, and others to generate user notifications and other output to support and manage package update and installation activities.

Figure 2:
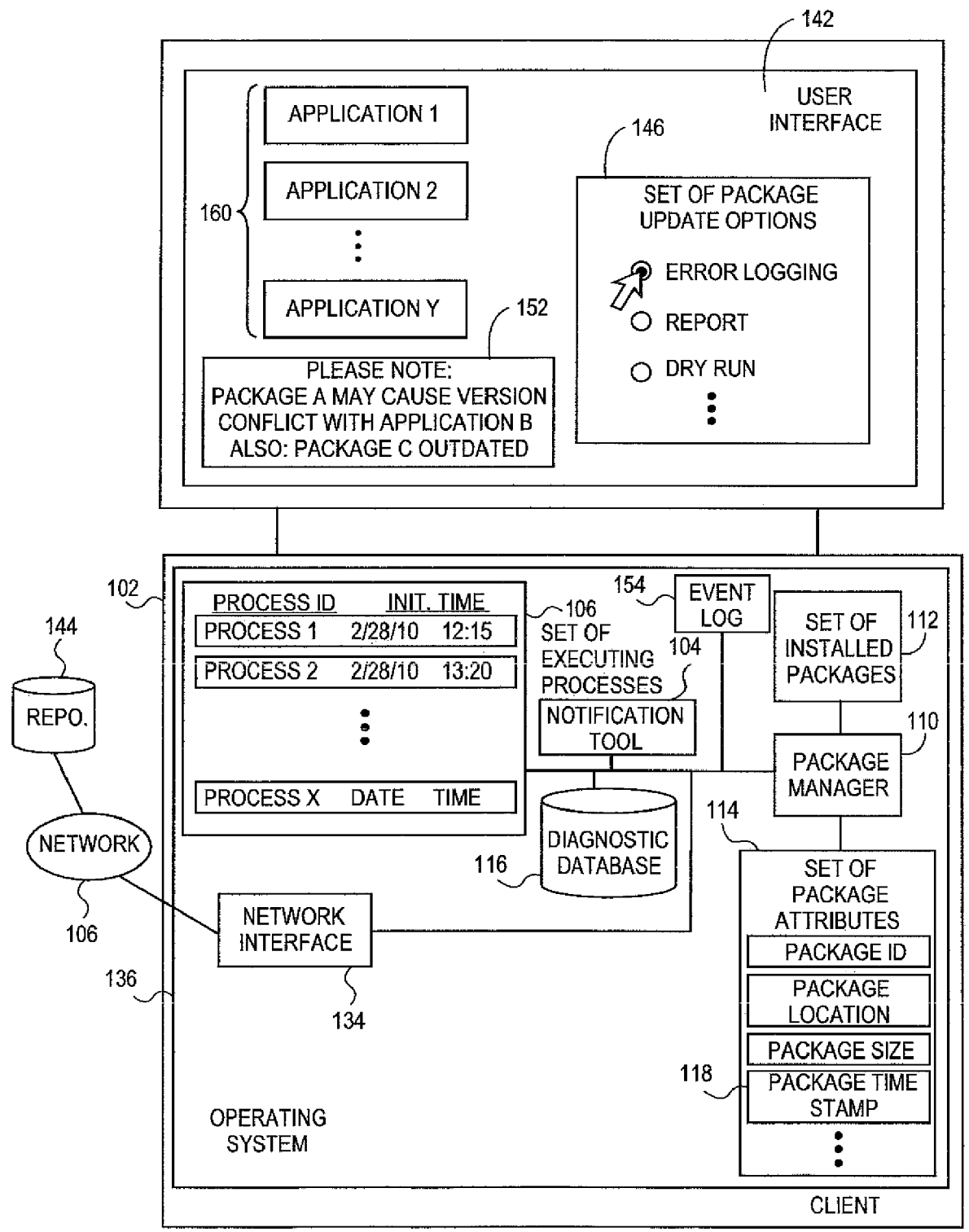
FIG. 2 illustrates an overall network in which for systems and methods for generating predictive diagnostics via a package update manager can be implemented, according to various embodiments in further regards.

As illustrated for example more particularly in FIG. 2, package manager 110 can connect to one or more package repository 144 via one or more network 106. Package manager 110 can present and manage set of update options 146 to initiate and conduct download activity, for instance to initiate the download of one or more package update 150. In conjunction with those activities, notification tool 104 can examine the user's selected packages, options, and other settings for download and installation, and generate a notification 152 to indicate one or more conditions related to the package activity and status of client 102. Notification tool 104 can maintain and/or access a diagnostic database 116 to identify faults, errors, and/or other conditions which will be notified to the user or other party via notification 152 and/or other communication.

Notification tool 104 can, for instance, access an event log 154 maintained or generated by operating system 136 to determine any recent process-related or other events or conditions associated with the resources of client 102, that may present an issue for the downloading or installation of one or more package update 150. For instance, event log 154 or other records may indicate that client 102 contains a certain amount of storage or memory resources, which resources may or may not permit the proper installation of one or more package update 150. For instance, notification 152 generated by notification tool 104 can indicate or report to the user indications such as the number or type of plug-ins installed in client 102, the total number of packages installed in client 102, the amount of up-time recorded for client 102, a record of conditions such as "-force" and/or "no-deps" located in a a "~/.bash history" directory, and/or the status or condition of other resources on client 102. For further example, notification 152 can contain information regarding the activation and/or disablement of various services or utilities on client 102, such as gpg signature checking or other security features, as well as the number, location, type, and/or other attributes of repositories enabled for update activity on client 102. Notification 152 can likewise contain warnings or indications regarding the number and/or identity of various versions of application or operating system software. Other types of conditions related to the state of client 102 and its resources, as well as set of installed packages 112 and other resources, can be identified and reported to the user via one or more notification 152. Due in some regards to the inspection of the resource "health" of client 102 at or around the time that package update activity takes place, the user may have an enhanced ability to avoid faults or other complications related to or caused by attempted package updates, installations, and or configurations. It may be noted that notification tool 104 can, in aspects, analyze client 102 and target package files and/or other resources before, during, and/or after actual download and/or installation of one or more package update 150. It may also be noted that according to aspects, notification tool 104 can identify and generate notifications automatically, and/or, can generate notification, repair, and/or other activity based on user configuration settings, such as selections to display or suppress the display of selected notifications, and/or to automatically perform selected repair actions or other processes, as described herein.

According to aspects, notification tool 104 and/or other logic can examine prospective update activity, and generate one or more notification 152 on a predictive basis, before the user has downloaded and/or installed one or more package update 150. In a pre-download or pre-installation stage, notification tool 104 and/or other logic can, for instance, analyze resource constraints on client 102 prior to downloading and/or updating any package update(s) and/or associated files, such as memory, storage, security, and/or other constraints that may determine what package(s) client 102 can or can not accept. For instance, one or more package update 150 that requires more storage than client 102 has available can be notified via notification 152. When generating predictive notifications, notification tool 104 can likewise access other data resources, such as diagnostic database 116, which may contain for instance reports or lists of software package update versions which are known to be incompatible with other software, such as applications or operating systems and/or versions thereof. It may be noted that in aspects, diagnostic database 116 can likewise contain executable code and/or other resources for performing diagnostic tests, in addition to or instead of bug lists or other data. Other data can be examined by notification tool 104 to generate one or more notification 152 on a pre-download and/or pre-installation basis. Conversely, notification tool 104 can also or instead generate one or more notification 152 after installation of one or more package update 150 to set of installed packages 112 of client 102. According to aspects, in addition to or instead of the types of data analyzed on a predictive basis, in this case notification tool 104 can examine data such as lists or records of executing processes on client 102 via operating system 136 and/or other resources, to determine, for instance, whether an installed package and/or one or more of its executable files has caused or experienced a fault state, such as a conflict, hang, and/or other condition. In aspects, notification tool 104 can probe and identify conflicts with other software and/or hardware executing or running on client 102, to determine fault conditions that may arise after an installed package (and/or update) begins to run. The status or condition of other hardware, software, services, and/or other resources can be examined during either a pre-download, pre-installation, and/or post-installation stage of package update activities.

In aspects, instead and/or in addition to performing an analysis and identification of potential faults or other conditions in the hardware, software, services, and/or other state of the resources of client 102, notification tool 104, package manager 110, and/or other logic can generate one or more software repair actions in response to the detected state of client 102 and its set of installed packages 112 and/or other resources. In aspects, notification tool 104 can for instance detect and identify one or more corrupted, damaged, and/or missing files in connection with one or more package update 150, and/or other files. In instances where a damaged or missing file or files is discovered, notification tool 104 can initiate a downloading and re-installation of that missing file or files. Replacement files can for instance be accessed and/or downloaded from one or more repository 144, and/or from other data stores, locations, or sites. In aspects, notification tool 104 and/or other logic can detect or identify other conditions requiring or permitting software re-installation or other repair. For example, notification tool 104 can determine that an identified file is located on client 102, but is stored in an incorrect location on that machine, such as for example in an incorrect directory or library. In cases of incorrect file locations or storage, notification tool 104 and/or other logic can transfer and/or copy the incorrectly stored file to a correct location. Notification tool 104 and/or other logic can for instance interact with operating system 136 to effect a copy or move command, to place the subject file in a different directory, library, and/or other location or destination.

Notification tool 104 and/or other logic can perform other software repair activities in connection with actual or prospective package download activity. For example, notification tool 104 and/or other logic can perform version control to ensure that the versions of any of one or more package update 150, set of installed packages 112, operating system 136, and/or other applications, drivers, utilities, and/or other software conforms to versions necessary or compatible with proper operation of client 102. In aspects, notification tool 104 and/or other logic can perform version management by accessing remote stored databases and/or other sites which record compatibility lists or records for operating system, application, and/or other software. In connection with any software repair activity, notification tool 104 and/or other logic can also inspect local resources of client 102, such as operating system 136, including its registry or other components. In aspects, notification tool 104 and/or other logic can perform one software repair or correction, or, can perform a series or sequences of repair actions or corrections. In embodiments where multiple corrections are performed, notification tool 104 and/or other logic can re-test client 102, set of installed packages 112, and/or resources of client 102 to determine the set of changes caused by the repair action, and possibly modify any additional repair actions that may be required.

Figure 3:
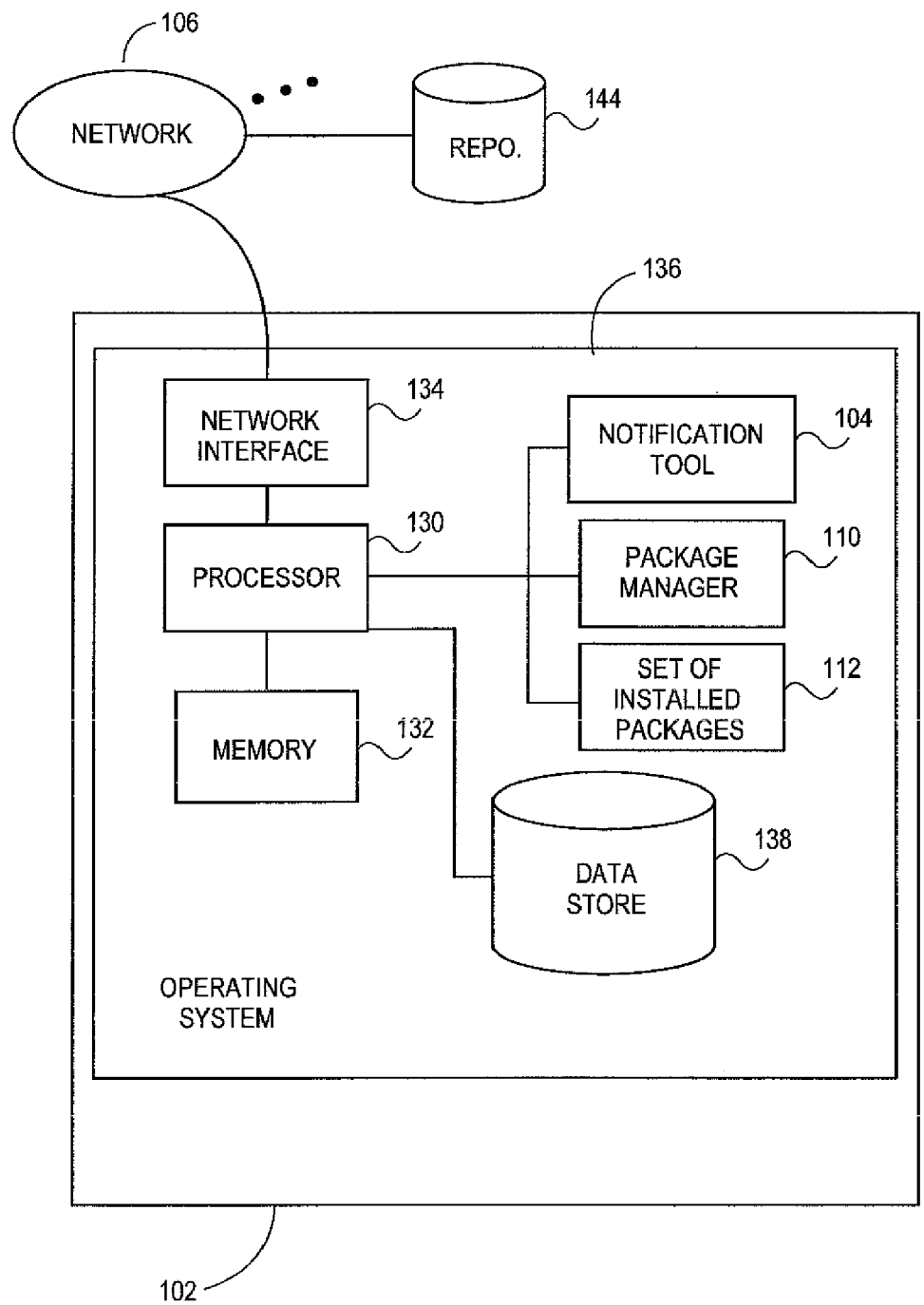
FIG. 3 illustrates exemplary hardware and other resources of a client machine that can be used in systems and methods diagnostic notification via a package update manager, according to various embodiments.

FIG. 3 illustrates an exemplary diagram of hardware and other resources that can be incorporated in a client 102 configured to manage, analyze, test and configure a set of installed packages 112 and other resources, according to embodiments. In embodiments as shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 also communicates with notification tool 104, package manager 110, and/or other resources to execute control logic and control the updating, installation, analysis and management of software packages and their associated processes. Other configurations of client 102, including processor and memory resources, associated network connections, and other hardware and software resources are possible.

Figure 4:
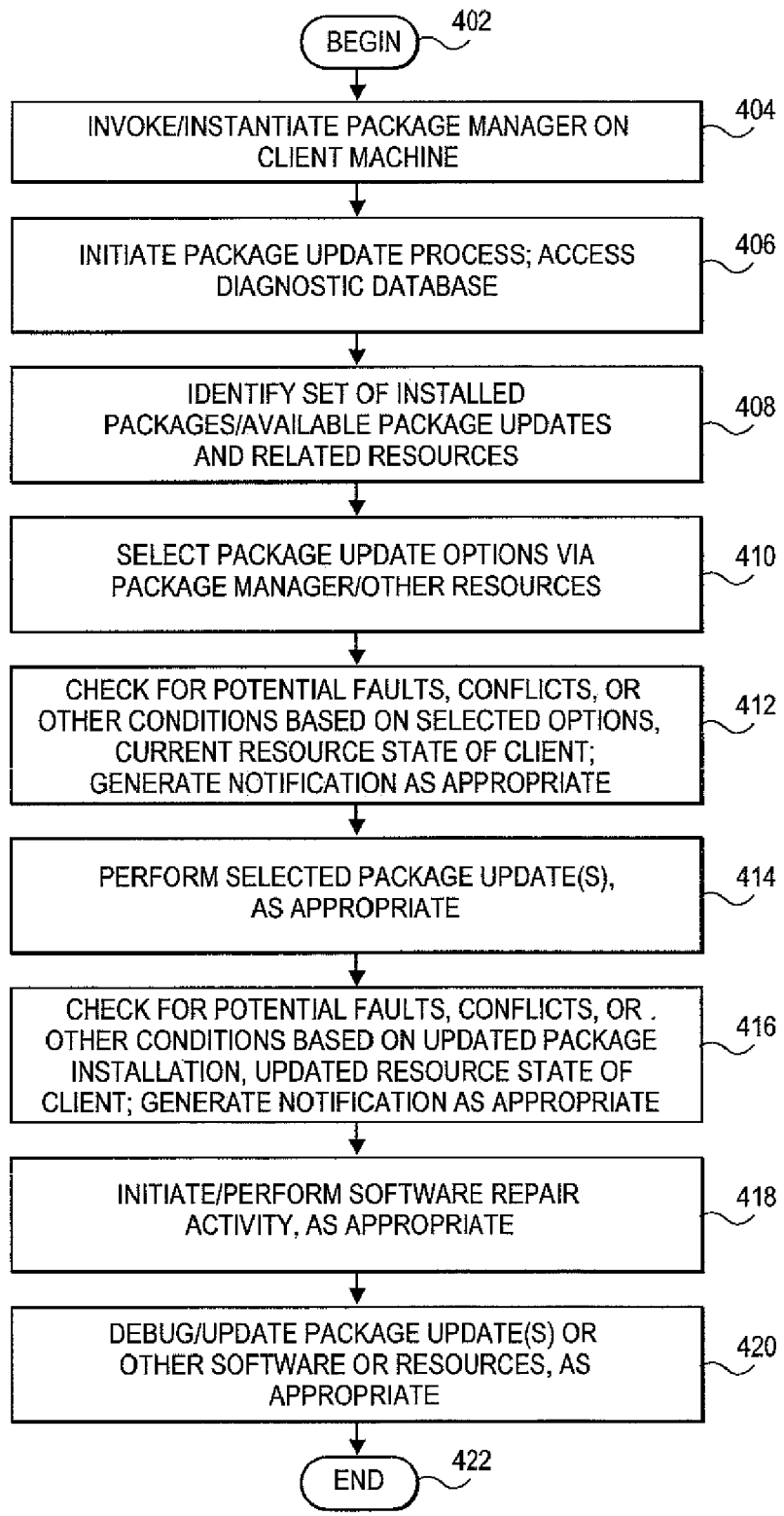
FIG. 4 illustrates a flowchart of software package update management and detection of system conditions that can be used in systems and methods for generating predictive diagnostics via a package update manager, according to various embodiments.

FIG. 4 illustrates overall processing to track, monitor, and manage software package updates and associated client system conditions, according to various embodiments. In 402, processing can begin. In 404, a user can invoke or instantiate package manager 110 on client 102 to perform software package update maintenance, testing, and other management activity. In 406, a user can initiate package update processing or related activity via package manager 110 and/or other logic.

In 408, package manager 110 can identify a set of installed software packages 112 hosted in client 102, for instance, by calling an application programming interface (API) of operating system 136 of client 102 to enumerate installed packages and related resources, such as files, directories, and/or other resources. Package manager 110 can in addition or instead identify available package updates via communication with one or more repository 144 hosting one or more sets of software package updates for application, operating system, and/or other software. In 410, a user can select one or more package update options via package manager 110 and/or other resources, such as to select, for instance, the name or version of a software package to download and install on client 102, the time of that installation, any security features to be used for that update activity, and/or other configuration options.

In 412, notification tool 104, package manager 110, and/or other logic can check for potential faults, conflicts, bugs, and/or other conditions that may occur or develop upon downloading software package(s) based on the selected download options, the current state of the resources of client 102, and/or other factors. For instance notification tool 104, package manager 110, and/or other logic package can determine that the existence or location of a file, library, or directory reflected in the pending, but not yet performed, package update does not match download option information, directories currently maintained by client 102, and/or other data or specifications. In aspects, notification tool 104 can generate a notification to the user of any potential conflicts, faults, and/or other conditions or information, as appropriate. For instance, notification tool 104 can generate a list of potentially fault-inducing files or packages, and present the user with a checklist of files or packages to include or exclude from the updating event. Other notifications are possible.

In 414, package manager 110 can perform any selected package updates selected by the user after receiving any notifications, as appropriate. In 416, notification tool 104, package manager 110, and/or other logic can check for potential faults, conflicts, bugs, and/or other conditions based on the updated package installation, updated state of resources on client 102, and/or other factors or data. In 418, notification tool 104 and/or other logic can initiate and/or perform software repair activity, such as replacing, updating, and/or moving missing, damaged, and/or outdated files, including files in set of installed packages 112 or otherwise. In 420, the user can use package manager 110, notification tool 104, and/or other logic to debug, configure, further update, and/or otherwise manipulate or manage the set of installed packages 112, as appropriate. In 422, processing can return to a prior processing point, jump to a further processing point, or end.

The foregoing description is illustrative, and variations in configuration and implementation may occur to persons skilled in the art. For example, while embodiments have been described in which a unitary package manager 110 is configured to control package update activity, in embodiments, multiple applications or software can interact to control the downloading, installation, testing, and other management of software packages. For further example, while embodiments have been described in which package update activity is conducted on one client 102, in embodiments, multiple local or remote targets, clients, and/or other machines can register to package manager 110 and/or other logic or resources to receive or perform package update activity. Similarly, while embodiments have been described in which one diagnostic database 116 is accessed by notification tool 104, package manager 110, and/or other logic to identify potential faults or issues, in embodiments, multiple diagnostic or debugging databases can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    identifying a set of package updates available to update a set of installed software packages on a client machine;
    identifying, by a package manager executed by a processor, a potential fault condition related to the set of package updates by accessing, prior to downloading or installing the set of package updates, a diagnostic database comprising compatibility information for the set of package updates and the client machine and by accessing, prior to downloading or installing the set of package updates, an event log comprising a state of the client machine, the event log comprising an indication of one or more process-related events or conditions associated with resources of the client machine that affect downloading or installation of the set of package updates, and by comparing the state of the client machine from the event log to the compatibility information from the diagnostic database, wherein the potential fault condition comprises at least one of a package version fault, a file version fault, a directory fault, a library fault, a memory fault, or a security fault;
    generating, by the package manager executed by the processor, a repair action in view of the comparing the client machine from the event log to the compatibility information from the diagnostic database, wherein the repair action comprises at least one of adding a missing file to the package, modifying a corrupted file of the package, or correcting a directory location;
    generating, by the package manager executed by the processor, a modified set of package updates in view of the repair action; and
    executing the modified set of package updates on the client machine to update the set of installed software packages.

2. The method of claim 1, wherein the diagnostic database stores at least one of diagnostic tests or version control data.

3. The method of claim 1, wherein generating the modified set of package updates comprises generating at least one of a new file, modifying a file of the package, or updating a directory location.

4. The method of claim 1, further comprising:
    identifying an additional potential fault condition related to the modified set of package updates; and
    generating an additional repair action in view of the additional potential fault condition.

5. The method of claim 1, wherein sending the modified set of package updates is in view of installation options.

6. The method of claim 1, wherein the state of the client machine comprises at least one of a state of executing processes on the client machine, a memory state of the client machine, a processor state of the client machine, a communications state of the client machine, or a storage state of the client machine.

7. The method of claim 1, wherein the client machine comprises at least one of a virtual machine or a physical machine.

8. A system comprising:
a data store to store a set of installed software packages; and
a processor operatively coupled to the data store, the processor to execute a package manager to:
identify a set of package updates available to update a set of installed software packages on a client machine;
identify a potential fault condition related to the set of package updates by accessing, prior to downloading or installing the set of package updates, a diagnostic database comprising compatibility information for the set of package updates and the client machine and by accessing, prior to downloading or installing the set of package updates, an event log comprising a state of the client machine, the event log comprising an indication of one or more process-related events or conditions associated with resources of the client machine that affect downloading or installation of the set of package updates, and by comparing the state of the client machine from the event log to the compatibility information from the diagnostic database, wherein the potential fault condition comprises at least one of a package version fault, a file version fault, a directory fault, a library fault, a memory fault, or a security fault;
generate a repair action in view of the comparing the client machine from the event log to the compatibility information from the diagnostic database, wherein to generate the repair action, the processor is to at least one of add a missing file to the package, modify a corrupted file of the package, or correct a directory location;
generate a modified set of package updates in view of the repair action; and
execute the modified set of package updates on the client machine to update the set of installed software packages.

9. The system of claim 8, wherein the client machine comprises at least one of a virtual machine or a physical machine.

10. A non-transitory computer readable storage medium comprising data to cause a processor to:
identify a set of package updates available to update a set of installed software packages on a client machine;
identify, by a package manager executed by the processor, a potential fault condition related to the set of package updates by accessing, prior to downloading or installing the set of package updates, a diagnostic database comprising compatibility information for the set of package updates and the client machine and by accessing, prior to downloading or installing the set of package updates, an event log that comprises a state of the client machine, the event log comprising an indication of one or more process-related events or conditions associated with resources of the client machine that affect downloading or installation of the set of package updates, and by comparing the state of the client machine from the event log to the compatibility information from the diagnostic database, wherein the potential fault condition comprises at least one of a package version fault, a file version fault, a directory fault, a library fault, a memory fault, or a security fault;
generate a repair action in view of the comparing the client machine from the event log to the compatibility information from the diagnostic database, wherein to generate the repair action, the processor is to at least one of add a missing file to the package, modify a corrupted file of the package, or correct a directory location;
generate a modified set of package updates in view of the repair action; and
execute the modified set of package updates on the client machine to update the set of installed software packages.

11. The non-transitory computer readable storage medium of claim 10, wherein the diagnostic database stores at least of one a diagnostic test or version control data.

12. The non-transitory computer readable storage medium of claim 10, the processor further to:
identify an additional potential fault condition related to the modified set of package updates; and
generate an additional repair action in view of the additional potential fault condition.

13. The non-transitory computer readable storage medium of claim 10, wherein the processor to generate the repair action in view of at least one of client conditions comprising a client plug-in, an amount of client up-time, or an active client service.

14. The non-transitory computer readable storage medium of claim 10, wherein the client machine comprises at least one of a virtual machine or a physical machine.

* * * * *